United States Patent [19]

Durand

[11] Patent Number: 4,656,891
[45] Date of Patent: Apr. 14, 1987

[54] PLANETARY GEAR BOX WITH TWO DOUBLE ECCENTRICS

[76] Inventor: Francois Durand, 11 rue du Bateau, 06600 Antibes, France

[21] Appl. No.: 784,851

[22] Filed: Oct. 4, 1985

[30] Foreign Application Priority Data

Oct. 8, 1984 [FR] France ................................ 84 15856

[51] Int. Cl.⁴ ............................................. F16H 1/28
[52] U.S. Cl. ........................................ 74/804; 74/805
[58] Field of Search .................................. 74/804, 805

[56] References Cited

U.S. PATENT DOCUMENTS

| | | | |
|---|---|---|---|
| 3,129,611 | 4/1964 | Lee | 74/804 |
| 3,160,032 | 12/1964 | Black | 74/804 |
| 3,478,623 | 11/1969 | Noguchi | 74/804 X |
| 4,183,267 | 1/1980 | Jackson | 74/804 |
| 4,297,920 | 11/1981 | Richter | 74/804 |
| 4,348,918 | 9/1982 | Fukui | 74/805 |
| 4,407,170 | 10/1983 | Fukui | 74/804 |
| 4,567,790 | 2/1986 | Butterfield et al. | 74/804 |

*Primary Examiner*—Leslie Braun
*Assistant Examiner*—Joseph M. Rolnicki
*Attorney, Agent, or Firm*—Karl F. Ross; Herbert Dubno

[57] ABSTRACT

In a plant gear box or transmission with two double eccentrics, radial clearance is provided in the bearings of one planet which is greater than that of the other planet for optimum force splitting.

12 Claims, 11 Drawing Figures

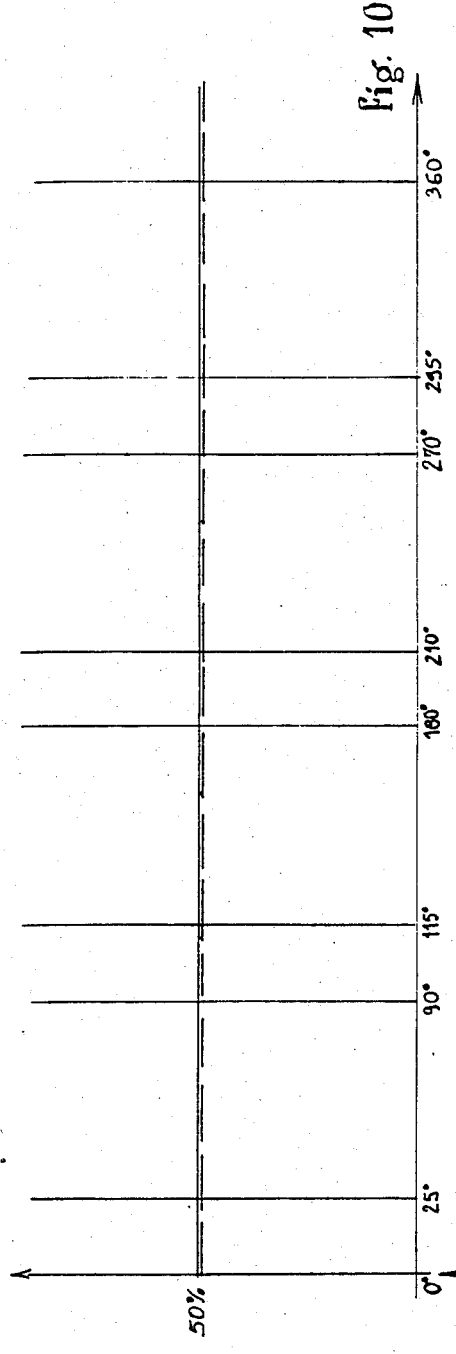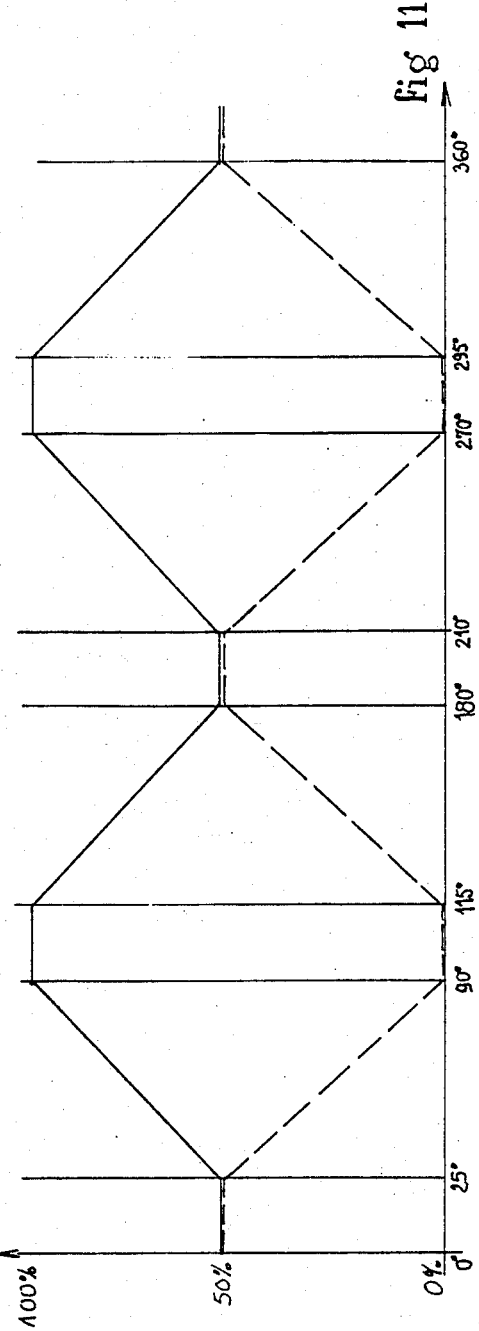

PLANETARY GEAR BOX WITH TWO DOUBLE ECCENTRICS

FIELD OF THE INVENTION

My present invention relates to a planetary gear transmission using eccentrics or crankpins carrying the planet gears and, more particularly to a planetary gear box with two double eccentrics.

BACKGROUND OF THE INVENTION

A planetary gear box can comprise a first outer (external) gear secured to an input shaft, a plurality of second external or outer gears meshing with the first outer gear, a plurality of crankpins which are connected to the second outer gears so that the rotary movement of the second outer gears is transduced into a rotational movement of the crankpins, and at least two geared wheels, or planets, which have a plurality of pin holes formed therein, which are circumferentially spaced from each other and outer gear teeth formed at the periphery of each planet.

The crankpins are inserted into the pin holes so that the eccentric revolutional movements of the planets, which are angularly spaced, are generated by means of the rotational movement of the crankpins.

An outer gear ring surrounds the outer gear teeth of the planets and has inner (internal) gear teeth which mesh with the planets, this gear ring being on or forming the outer part of the housing of the gear box either as a stationary or as a low speed rotating element. The crankpins are journaled in a planet carrier which is either the low speed rotating element or the stationary element of the planetary gear transmission.

Planetary gear boxes which have the construction mentioned above are described in U.S. Pat. No. 3,129,611 of Apr. 21, 1964.

However the planetary gear box disclosed in the above mentioned U.S. Pat. No. 3,129,611 does not satisfy all requirements for:

(a) a good power split of the input power between the different crankpins;

(b) a maximum reduction of the reaction forces of the meshing forces on the crankpin bearings; and (c) the best possible realistic calculation of the effect of teeth load reaction upon the different crankpin bearings.

Each planet being a rigid plate, the different crankpin bearings of the same planet are in the same plane of a rigid plate. For this reason the meshing force acting in the common plane of the different crankpin bearings has completely different reactions on the different crankpin bearings, depending on the different clearances, due to machining tolerances, in the different crankpin bearings.

The variations in the reaction forces acting on the three individual crankpin bearings have a big influence for the power split between the different crankpins. As a result all the power of the input pinion could be transmitted by only one of the different crankpins. To avoid such a poor operating condition, the machining tolerances for all parts and particularly for the radial bearing clearances have to be extremely accurate for a construction as shown in U.S. Pat. No. 3,129,611.

On top of this, this planetary gear box has, as it is described, a large number of parts requiring very high precision machining to work properly. This is not economical.

Another planetary gear box which has the construction mentioned above is the U.S. Pat. No. 4,407,170 of Oct. 4, 1983, it has the same disadvantages concerning internal power split and bearings loads as U.S. Pat. No. 3,129,611, its planet carrier is different, it needs planet carrier bearings which are almost as large in diameter as the toothed part of the planets, this can be very expensive for industrial gear boxes where the planets have diameters.

OBJECTS OF THE INVENTION

It is the principal object of the present invention to provide an improved planetary gear transmission using eccentrics or crankpins whereby the drawbacks of prior art devices are obviated.

Another object of this invention is to provide an improved double-eccentric gearbox which is comparatively simple and more reliable than earlier constructions.

Another object of the present invention is to provide a planetary gear box of the construction described above which, however, obviates the above mentioned disadvantages, has improved operating reliability and reduced manufacturing costs with the possibility, for a given transmitted power, to calculate with usual bearing manufacturers' methods, the life time for the different crankpins bearings.

SUMMARY OF THE INVENTION

These objects are achieved in accordance with the invention in a planetary gearbox of the construction described above but wherein the planetary gear box of the present invention has only two planets and two crankpins. The two eccentrics of each crankpin are angularly spaced 180°, the two crankpins are diametrically opposed as far as possible one from the other to minimize the reactions on the bearings of the meshing force between each planet and the outer gear ring.

Each of the two crankpins has, for its double eccentric, a bearing with normal internal radial clearance or play on one eccentric and a bearing with increased internal radial clearance or play on the other eccentric.

Alternatively each of the two crankpins can at the double eccentric have a bearing of reduced inner radial play or clearance on one eccentric and a bearing with a normal inner radial clearance on the other eccentric.

Of course both of these constructions may be used simultaneously.

Each planet has for one pin hole a bearing with normal internal radial clearance and for the other pin hole a bearing with increased internal clearance.

Of course in the alternative embodiment described, each planet wheel has in one pin hole a bearing with a reduced (less than normal) radial play or clearance and in the other pin hole a bearing with normal inner radial clearance. This allows splitting or halving of the input power between the two crankpins and enables determination of a realistic reaction split of the meshing forces between the different crankpin bearings.

To minimize the influences of manufacturing tolerances:

(a) The two planets are bolted together for machining the pin holes and the outer gear teeth on both planets at the same time.

(b) Both second outer gears are keyed on a common shaft or mandrel for machining the outer gear teeth on both second outer gears at the same time.

(c) The two flanges of the planet carrier are bolted together for machining the bearing bores for the crankpins and the trunions bores for the cross beams on the two flanges at the same time.

(d) The two double-eccentric shafts are simultaneously manufactured or machined from a single workpiece and, after machining to ensure exact duplication, the two shafts are axially separated from one another by parting said workpiece.

To increase the torsional rigidity of the planet carrier, each cross beam has at least two ribs and a collar, the collar being bolted on planet carrier flange of the output shaft.

BRIEF DESCRIPTION OF THE DRAWING

The above and other objects, features and advantages of the present invention will become more readily apparent from the following description, reference being made to the accompanying highly diagrammatic drawing in which:

FIGS. 10 and 11 are graphs which show for a complete revolution of the crankpins, i.e. position 0° to 360° of the crankpins with double eccentrics, the total sum of the torques to be transmitted for each crankpin, i.e. representing the assembly of the invention, a bearing with normal internal radial clearance and a bearing with increased internal radial clearance for each crankpin and each planet while FIG. 11 represents a system with two bearings with less internal radial clearance on one crankpin than on the other; due to manufacturing tolerances for the bearings, crankpin holes and planet carrier, this figure could be obtained if four bearings with normal internal radial clearance would be used for the two crankpins.

SPECIFIC DESCRIPTION

Figure 1:
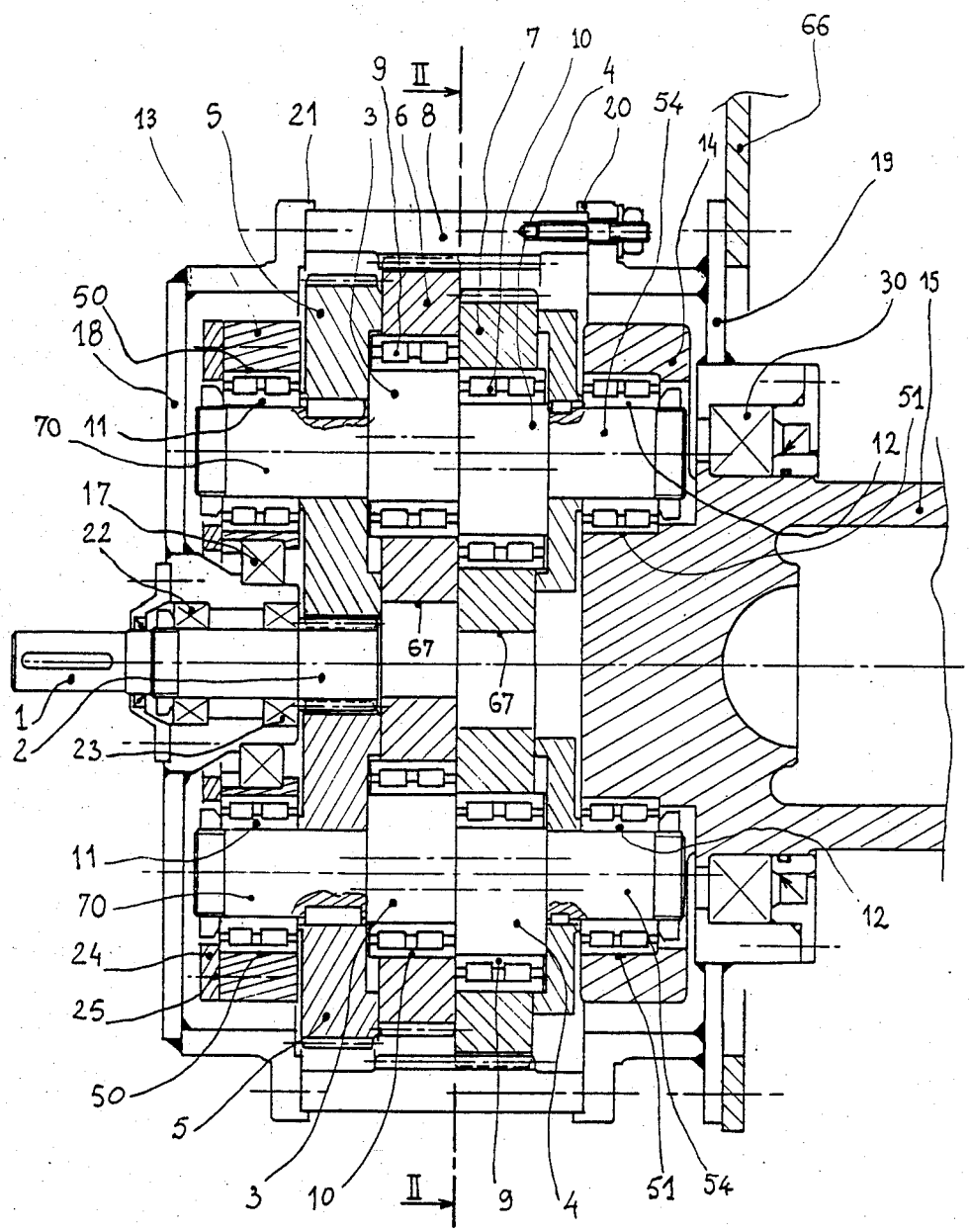
FIG. 1 is a cross sectional view of a first embodiment of the present invention as shaft mounted gear box with torque arm.

Referring to FIG. 1 which illustrates a first embodiment of the present invention applied to a shaft-mounted planetary gear box with two double eccentrics, the input shaft 1 is formed with the first outer or external gear 2 which drives both second outer or external gears 5 which are keyed on the crankpins 70, each crankpin having two eccentrics 3 and 4 which are angularly spaced 180°.

The rotation of the double eccentrics 3, 4 gives to the planets 6, 7, which mesh with the outer gear ring (internal gear) 8, a revolutional movement.

Each double eccentric 3, 4 carries the bearings 9, 10 which are respectively located in the pin holes of the planets 6, 7. Bearings 9 have a reduced or normal internal radial clearance and bearings 10 have an analogously thereto a normal or respectively increased internal radial clearance, for instance C4 of the bearings manufacturers norms.

The crankpins 70 are each journaled in the planets carrier by the means of bearings 11 and 12.

Figure 2:
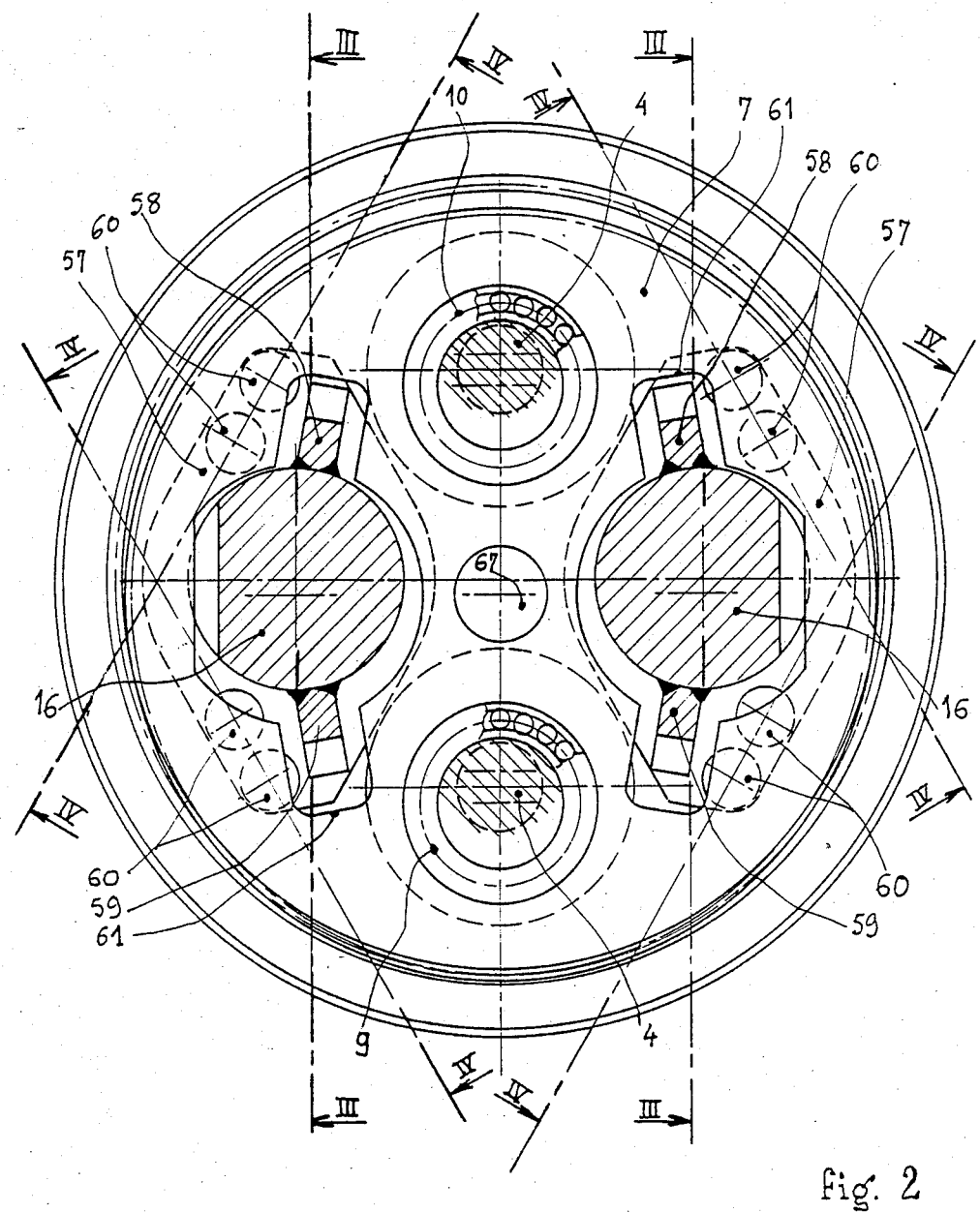
FIG. 2 is a cross sectional view taken along line II—II of FIG. 1.
Figure 3:
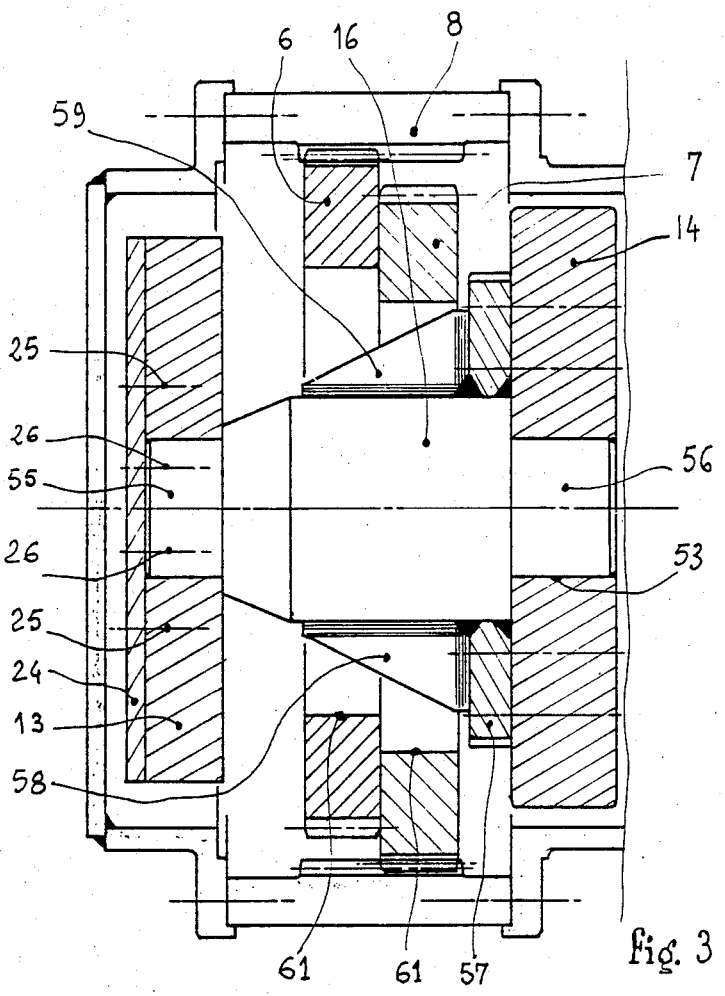
FIG. 3 is a cross sectional view taken along line III—III of FIG. 2.

Considering FIGS. 2 and 3 together with FIG. 1, the flange 14 with the output shaft 15 is rigidly connected to the flange 13 by the means of the two cross beams 16 with ribs 58, 59, collar 57 and trunions 55, 56 which are pressed respectively into flanges 13 and 14.

Flange 13 rigidly connected to flange 14 is the planet carrier. Planet carrier flange 13 is journaled by the means of bearing 17 in the input flange 18 of the gear box housing; output shaft 15 is journaled by the means of bearing 30 in the output flange 19 of the gear box housing; gear box housing flanges 18 and 19 are centered on the outside of geared ring 8 in 21 and 20, flanges 18, 19 and geared ring 8 are the housing of the planetary gear box, 66 is the torque arm which is bolted on flange 19.

Input shaft 1 of first outer gear 2 is journaled in the input flange 18 by the means of bearings 22 and 23. Circular flange 24 is bolted on planets carrier flange 13 and on the extremity 55 of the cross beams 16.

Figure 4:
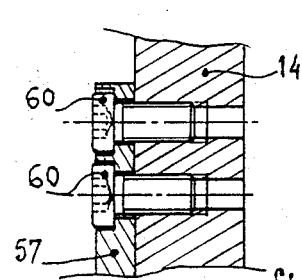
FIGS. 4 and 5 are part sectional views taken along line IV—IV of FIG. 2, FIG. 5 being a variation of the structure of FIG. 4.
Figure 5:
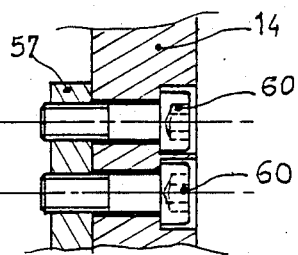

Considering FIGS. 4 and 5, the collar 57 of cross beams 16 is bolted on planet carrier flange 14 by the means of screws 60, this from the inside of the planets carrier on FIG. 4 and from the outside of the planets carrier on FIG. 5.

As can be seen from FIG. 2 collar 57 and screws 60 are behind planet 7 whose openings 61 are big enough to have the cross beams 16 with ribs 58, 59 passing through it, this with enough clearance to allow the revolutional or orbital movement of planets 6 and 7.

Figure 6:
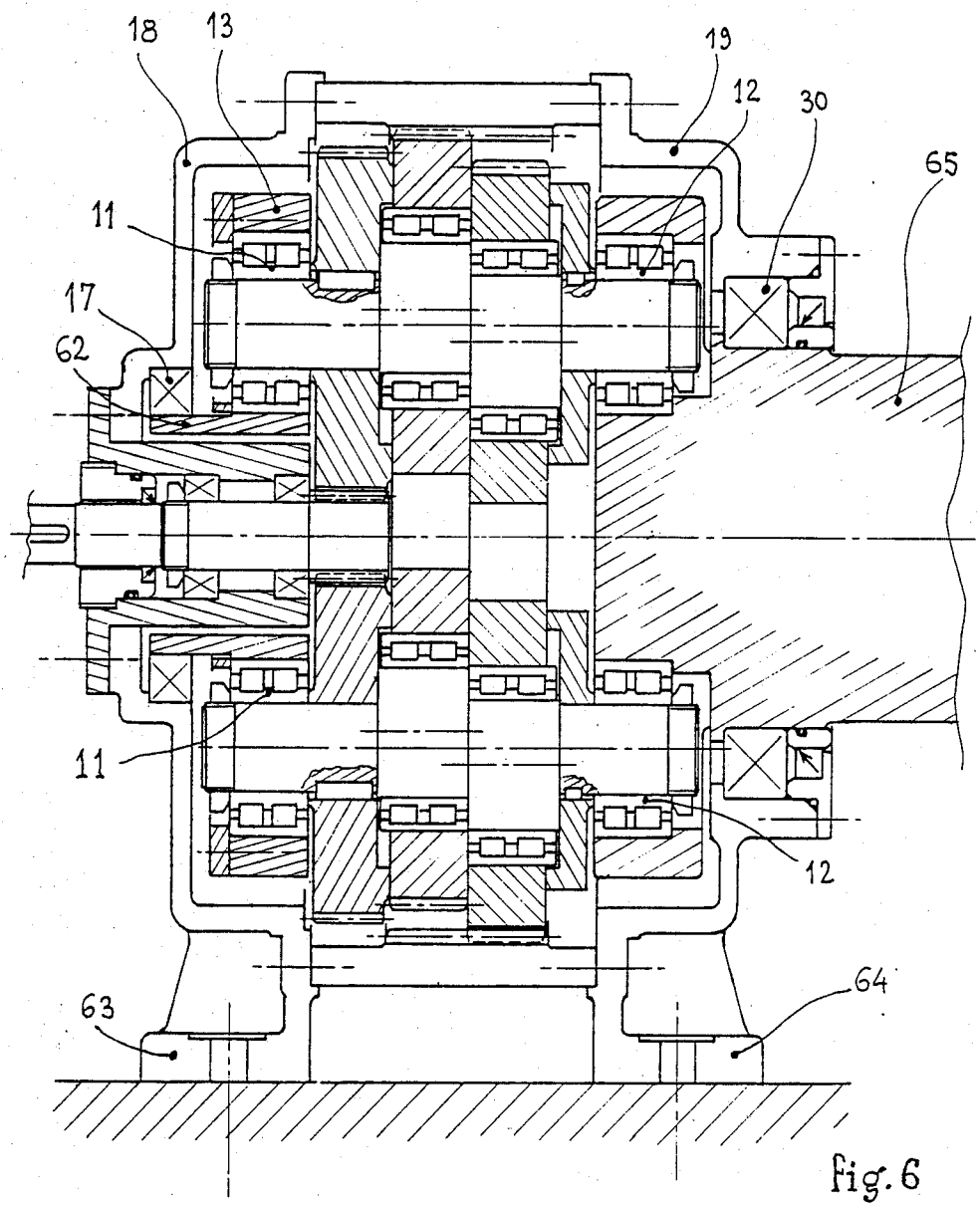
FIG. 6 is a view similar to FIG. 1 but for a gear box with feet and a conventional output shaft, the bearings between planet carrier and housing being bigger because of forces deriving from the output shaft, for instance output shaft coupling misalignment or tangential force on a sprocket which could be keyed on the output shaft.

Considering FIG. 6 the bearing 17 is bigger than the bearing 17 of FIG. 1, since on one hand the outside diameter of bearings 11 as it is in FIG. 1 and, on the other hand, the distance between bearings 17 and 30 is greater in FIG. 6 than in FIG. 1. This is interesting for the bearings of a foot mounted gear box with feet 63 and 64 as shown in FIG. 6 because bearing 17 does not only have internal reactions to support, but also reactions coming from the elements which are driven by the output shaft 65. These elements can be, for example, a sprocket, a coupling with misalignment or an open gear pinion. For shaft mounted gear boxes with a torque arm as shown in FIG. 1, bearing 17 has only internal reactions to support.

In FIG. 6 bearing 17 is centered on tube 62, which is part of planet carrier flange 13, and in housing flange 18. Despite tube 62, the planet carrier flanges 13 and 14 can be bolted together for machining together at the same time the bores for the cross beams trunions 55 and 56 and the bores 50 and 51 for the bearings 11 and 12. This minimizes the influences of the machining tolerances for the overall assembly. The bores 67 in the center of planets 6 and 7 are there for centering the planets when they are bolted together for machining the pinholes for the bearings 9 and 10 and the gear teeth.

Figure 7:
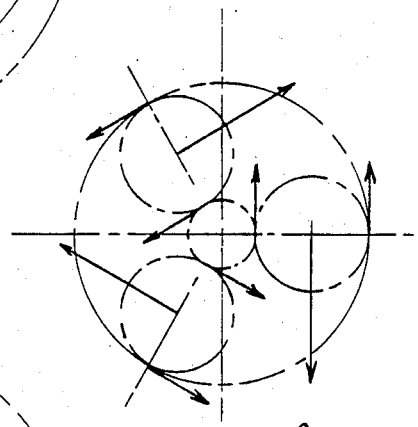
FIG. 7 is an informational diagram of the constant reactions on the planets bearings of a conventional planetary gear train for which the ratio is a fraction of that which can be obtained with a double eccentric planetary gear train according to the invention.

FIG. 7 shows, schematically, the constant forces split in a conventional planetary gear train for which the ratio can be only a fraction of the ratio of a multi-eccentrics planetary gear train.

FIG. 7 is provided for comparison with the split of the forces in a planetary gear train with multi-eccentrics for which the efforts split changes continuously during a complete rotation of the eccentrics. For illustration purposes FIGS. 8 and 9 show the reactions on the eccentric bearings for positions 0° or 360° in FIG. 8 and for position 90° in FIG. 9.

Figure 9:
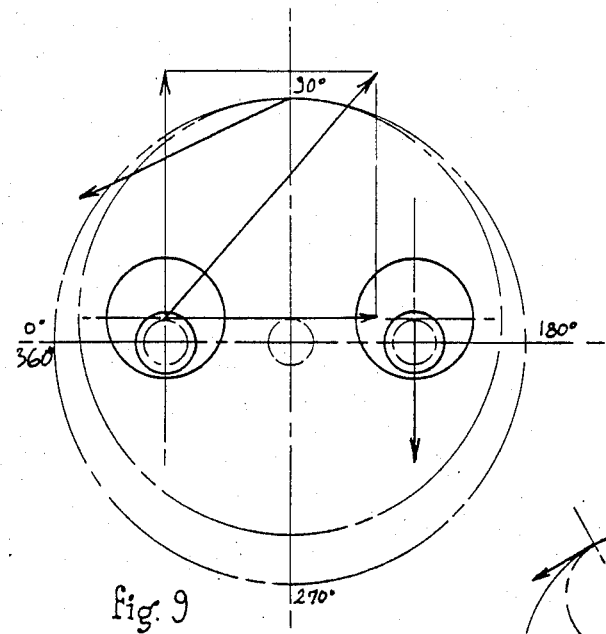
FIGS. 8 and 9 are diagrams which show, for gear teeth with pressure angle 25°, the reactions on the two eccentric bearings of the same planet in a system of the invention, for positions 0° or 360° in FIG. 8 and position 90° in FIG. 9, the reactions resulting from forces located in the common plane of the two eccentric bearings axis and reacting only on the eccentric located on the left side of FIGS. 8 and 9, i.e. the eccentric which has the bearing with normal internal radial clearance, the eccentric located on the right side having a bearing with an increased internal radial clearance.
Figure 8:
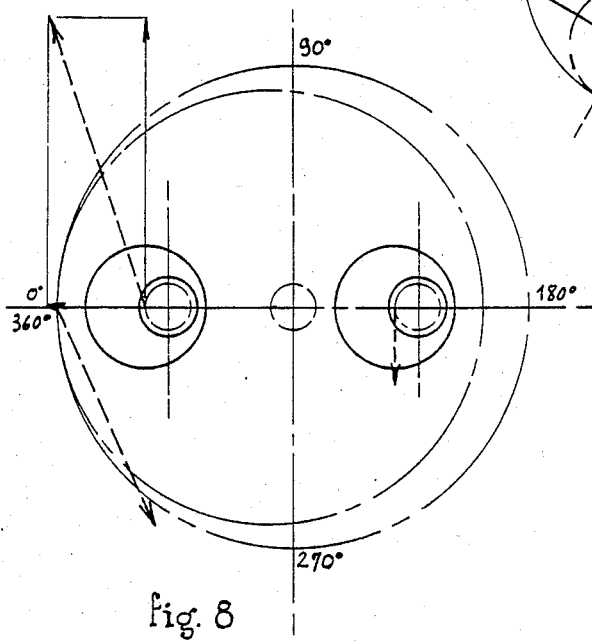

In FIGS. 8 and 9 the eccentric bearing located on the left has a normal internal radial clearance and the eccentric bearing located on the right has an increased internal radial clearance.

Forces for streams located in the plane passing through the axis of the two pin holes bearings only act on the bearing which is located on the left due to the internal radial clearance differences between those two bearings which are located in a rigid plate. The planet is a rigid plate. It is easy to see that with three pin holes instead of two:

(a) The distances between the pin holes would be smaller, which means greater reaction values reacting on each bearing during each revolution of the planet.

(b) The possibility to have an exact determination of the loads repartitions between three bearings located in a rigid plate by internal radial clearance differences would not be possible.

Considering FIG. 1 and a full rotation, 0° to 360°, of each crankpin 70, bearings 9 having a normal internal radial clearance and bearings 10 having an increased internal radial clearance, for instance C4, the total sum of the torques due to bearing reactions on each double eccentric 3, 4 gives a constant value as shown in FIG. 10.

This means that the input power coming from first outer gear 2 is equally split between both second outer gears 5.

If both bearings 9 with normal internal radial clearance are assembled on the same double eccentric 3, 4 and both bearings 10 with increased internal radial clearance are assembled on the other double eccentric 3, 4, the total sum of the torques due to bearings reactions on each double eccentric 3, 4 gives values as shown in FIG. 11.

This means that between 90° and 115° on one hand and 270° and 295° on the other hand, the double eccentric 3, 4 which has the two bearings 9 with normal internal radial clearance transmit almost 100% of the input power.

The other double eccentric 3, 4 which has the two bearings 10 with increased internal radial clearance does not transmit, then, any power at all.

Due to the machining tolerances of the different parts, the use of four bearings with normal internal radial clearance for the bearings 9 and 10 could bring about the situation as shown in FIG. 11.

This is disadvantageous because it is always the same teeth of second outer gear 5 which have to transmit 100% of the input power, so this second outer gear has to be dimensioned for twice the power of the outer gear with the bearing arrangement due to the present invention which is a bearing with normal (or reduced) internal inland clearance and a bearing with increased (or normal) internal clearance for each double eccentric 3, 4 and each planet 6, 7.

With the torque distribution of FIG. 10 at the input stage (pinion 2, gear 5) the transmission is not selfblocking.

With the torque transmission of FIG. 11 at the same input stage, the transmission is selfblocking between 90° and 115° and between 270° and 295°. This provides a significant advantage in the possibilities for mounting control.

The bearings 22, 23 of the input gear 2 are preferably selected with large radial clearance or are thus built in. This permits selfcentering of the gear 2 between the two gears 5. The selfcentering is only possible in this kind of double-eccentric transmission according to the invention because the power splitting is ensured according to FIG. 10 between the double eccentric 70.

I claim:

1. In a planetary gear box with two double eccentrics which comprises an input shaft, a first outer gear secured to said input shaft, a plurality of second outer gears meshing with the first outer gear, a plurality of crankpins which are connected to the second outer gears so that a rotary movement of the second outer gears is transduced into an orbital movement of the crankpins, two gear wheel and planets which have a plurality of pin holes formed therein circumferentially spaced from each other, said planets having outer gear teeth formed at the periphery of each planet, the crankpins being inserted into the pin holes so that eccentric revolutional movements of the planets, which are angularly spaced 180°, are generated by means of the orbital movement of the crankpins, an outer gear ring surrounding the outer gear teeth of the planets and having inner teeth which mesh with the planets, this gear ring being formed on an outer part of a housing of the gear box and constituting one member, the crankpins being journaled in a planet carrier forming another member, one of said members being a low speed rotating element and the other member being a stationary element of said planetary gear box, the improvement wherein: said gear box has only two of said crankpins diametrically opposite one another, each crankpin having a double eccentric, each double eccentric having a bearing with normal internal radial clearance on one eccentric and a bearing with greater than said normal internal radial clearance on the other eccentric, each planet having two pin holes equipped one with a bearing with normal internal radial clearance and the other with a bearing with greater than said normal internal radial clearance.

2. In a planetary gear box with two double eccentrics which comprises an input shaft, a first outer gear secured to said input shaft, a plurality of second outer gears meshing with the first outer gear, a plurality of crankpins which are connected to the second outer gears so that a rotary movement of the second outer gears is transduced into an orbital movement of the crankpins, two gear-wheel planets which have a plurality of pin holes formed therein circumferentially spaced from each other, said planets having outer gear teeth formed at the periphery of each planet, the crankpins being inserted into the pin holes so that eccentric revolutional movements of the planets, which are angularly spaced 180°, are generated by means of the orbital movement of the crankpins, an outer gear ring surrounding the outer gear teeth of the planets and having inner teeth which mesh with the planets, this gear ring being formed on an outer part of a housing of the gear box and constituting one member, the crankpins being journaled in a planet carrier forming another member, one of said members being a low speed rotating element and the other member being a stationary element of said planetary gear box, the improvement wherein:

said gear box has only two of said crankpins diametrically opposite one another, each crankpin having a double eccentric, each double eccentric having a bearing with an internal radial clearance on one eccentric less than a normal radial clearance and a bearing with said normal radial clearance on the other eccentric, each planet having two pin holes equipped one with a bearing of an internal radial clearance less than a normal radial clearance and the other with a bearing with said normal radial internal clearance.

3. The improvement defined in claim 1 wherein the planet carrier has two flanges rigidly connected by the means of two cross beams for which each cross beam has at least two ribs and a collar which is bolted on a planet carrier flange which is formed on an output shaft.

4. The improvement defined in claim 1 wherein the two planets are bolted together for machining the pin holes for the bearings and the outer gear teeth on both planets at the same time.

5. The improvement defined in claim 1 wherein both second outer gears are keyed on a common shaft for machining the outer gear teeth on both second outer gears at the same time.

6. The improvement defined in claim 1 wherein two flanges of a planet carrier are bolted together for machining respective bearing bores for the crankpins and respective bores for cross beams trunions on the two flanges at the same time.

7. The improvement defined in claim 1 wherein both of said crankpins have surfaces characteristic of having been machined simultaneously in a single workpiece which is axially parted to separate said crankpins from one another.

8. The improvement defined in claim 2 wherein the planet carrier has two flanges rigidly connected by the means of two cross beams for which each cross beam has at least two ribs and a collar which is bolted on a planet carrier flange which is formed on an output shaft.

9. The improvement defined in claim 2 wherein the two planets are bolted together for machining the pin holes for the bearings and the outer gear teeth on both planets at the same time.

10. The improvement defined in claim 2 wherein both second outer gears are keyed on a common shaft for machining the outer gear teeth on both second outer gears at the same time.

11. The improvement defined in claim 2 wherein two flanges of a planet carrier are bolted together for machining respective bearing bores for the crankpins and respective bores for cross beams trunions on the two flanges at the same time.

12. The improvement defined in claim 2 wherein both of said crankpins have surfaces characteristic of having been machined simultaneously in a single workpiece which is axially parted to separate said crankpins from one another.

* * * * *